United States Patent
Tsuji (10) Patent No.: US 6,860,109 B2
(45) Date of Patent: Mar. 1, 2005

(54) TURBINE EQUIPMENT (75) Inventor: Tadashi Tsuji, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 126 days.

(21) Appl. No.: 10/182,623
(22) PCT Filed: Dec. 4, 2000
(86) PCT No.: PCT/JP00/08572
§ 371 (c)(1),
(2), (4) Date: Aug. 1, 2002
(87) PCT Pub. No.: WO02/46589
PCT Pub. Date: Jun. 13, 2002

(65) Prior Publication Data
US 2003/0000222 A1 Jan. 2, 2003

(51) Int. Cl.$^7$ ................................................ F02C 7/18
(52) U.S. Cl. ........................................ 60/806; 415/115
(58) Field of Search ........................... 60/806; 415/115, 415/116, 117

(56) References Cited
U.S. PATENT DOCUMENTS 2,868,500 A * 1/1959 Boulet .......................... 60/806
5,782,076 A * 7/1998 Huber et al. .................. 60/806
6,098,395 A * 8/2000 North ........................... 60/806

FOREIGN PATENT DOCUMENTS

| JP | 8-284687 | 10/1996 |
| JP | 9-60531 | 3/1997 |
| JP | 10-196316 | 7/1998 |
| JP | 11-159345 | 6/1999 |
| JP | 2000-328962 | 11/2000 |

* cited by examiner

Primary Examiner—Louis J. Casaregola

(57) ABSTRACT

Part of compressed air discharged from a compressor is cooled by a cooler, and merged with a working fluid for a turbine to cool rotor blades of the turbine. Further, air from the compressor is bled through introduction passages, and the bled air is cooled by coolers and introduced to stationary blades of the turbine. The stationary blades of the turbine are cooled with air cooled by the coolers. A sufficient cooling effect is obtained by a small amount of air, and the amount of compressed air bled through the introduction passages is decreased. Compression power is converted into turbine output effectively.

1 Claim, 8 Drawing Sheets

FIG. 1

Exhaust Gas

Intake Air

TURBINE EQUIPMENT

TECHNICAL FIELD

This invention relates to turbine equipment having a compressor, a combustor, and a turbine.

BACKGROUND ART

Various ideas have been incorporated into turbine power generation equipment (turbine equipment) having a compressor, a combustor and a turbine in order to increase an electrical efficiency and a thermal efficiency. Of them, an idea of bleeding air from the compressor, and introducing it into the turbine to cool turbine blades has been put into practice. Cooling of the stationary blades of the turbine is performed by bleeding compressed air having a pressure corresponding to a stationary blade stage from the compressor, and introducing it into the site of a predetermined stage of the turbine. Cooling of rotor blades of the turbine is performed by introducing part of discharge air from the compressor into the turbine.

Conventional turbine equipment consumed a large amount of compressed air, because much air is required for cooling of the blades. Blade cooling air has a very low rate of conversion into output by turbine stages, and has decreased the rate of conversion into turbine output.

The present invention has been accomplished in view of the above circumstances, and its object is to provide turbine equipment capable of sufficiently cooling turbine blades while saving compressed air.

SUMMARY OF THE INVENTION

The turbine equipment of the present invention comprises a gas turbine having an introduction passage for introducing air, which has been bled from a compressor, for cooling blades of the turbine, characterized in that a cooler for precooling bled air for blade cooling is provided in the introduction passage in the gas turbine.

According to this feature, air for blade cooling can be cooled by the cooler and introduced into the turbine, so that the temperature of air introduced to the blades of the turbine can be lowered. Since compressed air for blade cooling is decreased, air for turbine actuation is increased. Thus, compression power can be effectively converted into turbine output, and power generation output increases.

In the turbine equipment of the present invention, moreover, an air recovery blade is provided in a turbine, and air recovery intercooling can be performed simultaneously. The resulting cold water is used to cool intake air for a low pressure compressor. Thus, power generation output and electrical efficiency can be increased.

Furthermore, fuel is used as a cold heat source for the cooler. Thus, cooling of compressed air can be carried out using a very simple configuration.

Additionally, the cooler is a fuel reformer. Thus, the increased calories of fuel can be made equal to or higher than mere sensible heat recovered, and reduction of fuel consumption can be enhanced.

In addition, a fuel cell, which is supplied with reformed fuel from the fuel reformer, is provided. Thus, it becomes possible to realize high efficiency gas turbine equipment topped with the high efficiency power generation of the fuel cell.

DETAILED DESCRIPTION OF THE PREFERRED EMBODIMENTS

The present invention will be described in greater detail with reference to the accompanying drawings.

Figure 1:
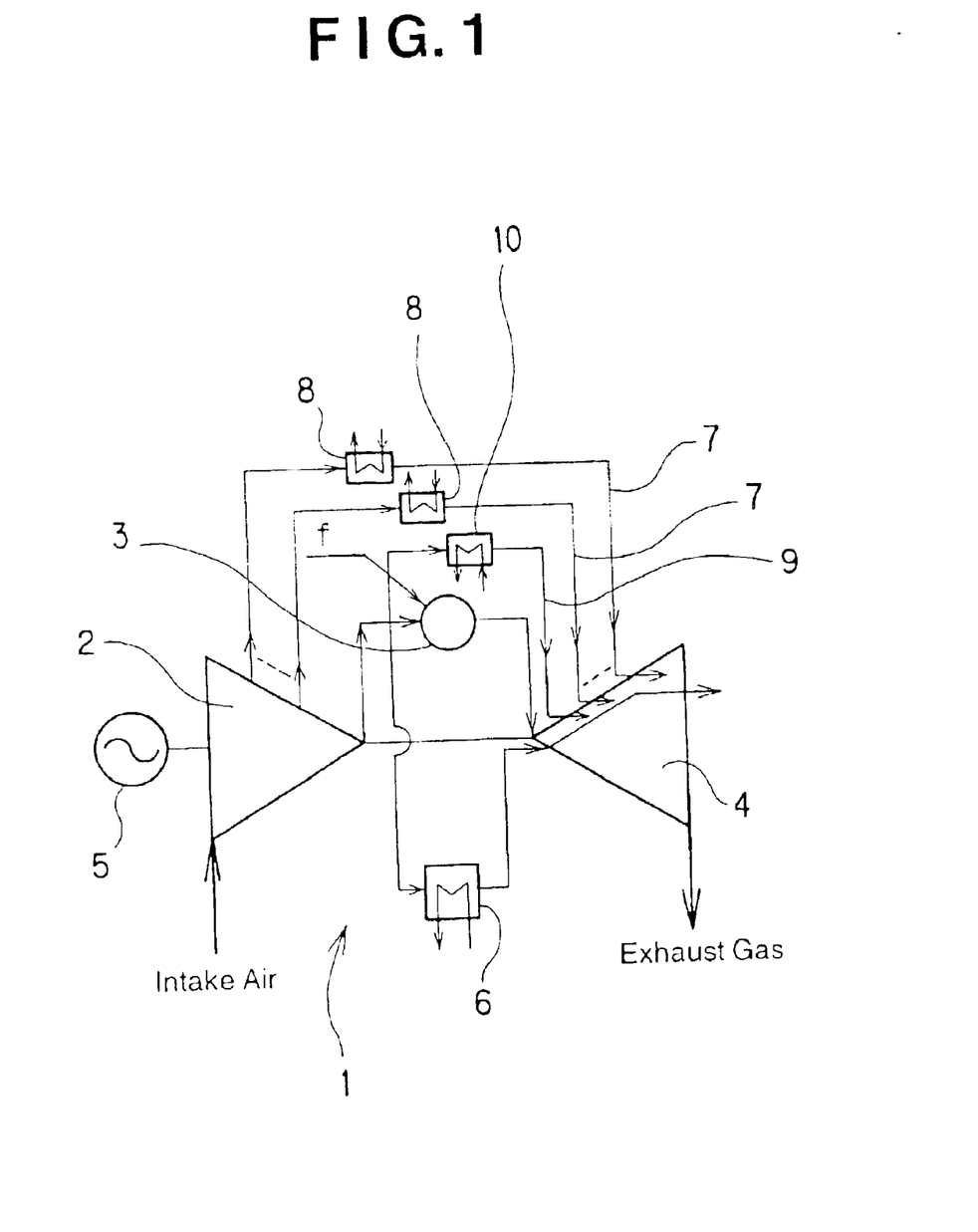
FIG. 1 is a schematic system diagram of turbine equipment according to a first embodiment of the present invention.

Turbine equipment 1 according to the first embodiment is described based on FIG. 1.

As shown in FIG. 1, the turbine equipment 1 has a compressor 2, a combustor 3, and a turbine 4, and a generator 5 is coaxially connected to the compressor 2. Air, compressed by and discharged from the compressor 2, is charged into the combustor 3 together with fuel f, and a combustion gas from the combustor 3 is expanded by the turbine 4. Part of compressed air discharged from the compressor 2 is cooled by a cooler 6, and merged with a working fluid for the turbine 4 in order to cool rotor blades of the turbine 4.

The turbine equipment 1 has a plurality of (two in the illustrated embodiment) introduction passages 7 for introducing air, which has been bled from the compressor 2, for the purpose of cooling the blades (stationary blades) of the turbine 4, and each introduction passage 7 is equipped with a cooler 8. Air bled from the compressor 2 is cooled by the cooler 8, and introduced into the turbine 4. An introduction passage 9 is provided for introducing part of compressed air, which has been discharged from the compressor 2, for the purpose of cooling the stationary blades of the turbine 4, and the introduction passage 9 is equipped with a cooler 10.

In the above-described turbine equipment 1, part of compressed air discharged from the compressor 2 is cooled by the cooler 6, and merged with the working fluid for the turbine 4 to cool the rotor blades of the turbine 4. Further, air from the compressor 2 is bled through the introduction passages 7, and the bled air is cooled by the coolers 8 and introduced to the stationary blades of the turbine 4. The stationary blades of the turbine 4 are cooled with air cooled by the coolers 8. Also, part of compressed air discharged from the compressor 2 is introduced into the introduction passage 9, and cooled by the cooler 10 to cool the stationary blades of the turbine 4.

Thus, air for blade cooling is cooled by the coolers 8, so that the temperature of air introduced to the stationary blades of the turbine 4 can be lowered. Hence, a sufficient cooling effect is obtained by a small amount of air, and the amount of compressed air bled through the introduction passages 7 can be decreased. As a result, air charged into the combustor 3 (and turbine 4) can be increased in amount, thus making it possible to convert the compression power into turbine output effectively.

Figure 2:
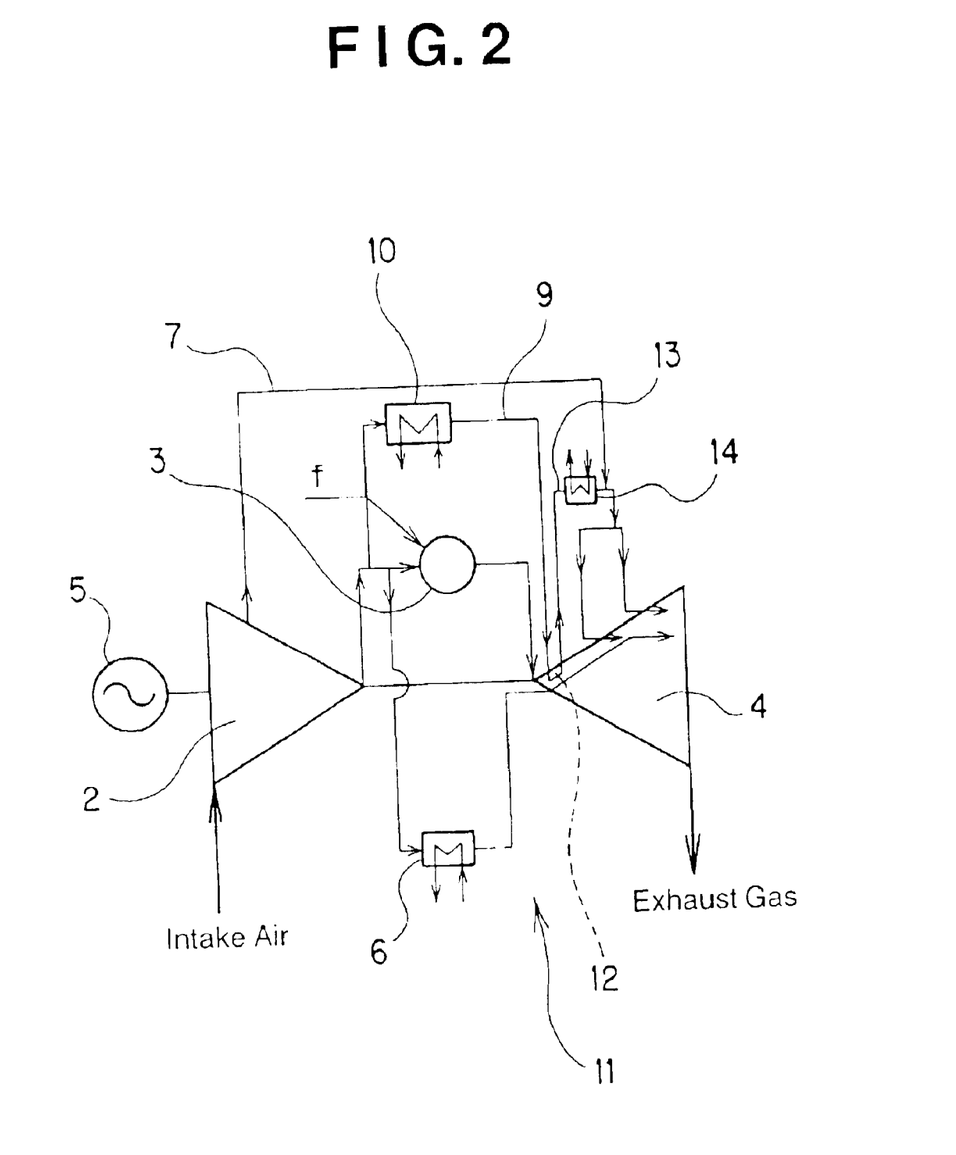
FIG. 2 is a schematic system diagram of turbine equipment according to a second embodiment of the present invention.

Turbine equipment 11 according to the second embodiment is described based on FIG. 2. The same constituent elements as in the turbine equipment 1 shown in FIG. 1 are assigned the same numerals, and duplicate explanations are omitted.

As shown in FIG. 2, the turbine equipment 11 has an air recovery blade 12 provided in a turbine 4, and an introduction passage 13 is provided for guiding air, which has been recovered from the air recovery blade 12, to stationary blades on a low pressure side of the turbine 4. The introduction passage 13 is equipped with a cooler 14, and air, which has been recovered from the air recovery blade 12, is cooled by the cooler 14, and introduced to the stationary blades on the low pressure side of the turbine 4. An introduction passage 9 is merged into the introduction passage 13 on a downstream side of the cooler 14.

In the above-described turbine equipment 11, part of compressed air discharged from the compressor 2 is introduced into the introduction passage 9, and cooled by a cooler 10 to cool the air recovery blade 12 of the turbine 4. Further, air recovered from the air recovery blade 12 is cooled by the cooler 14, and introduced to the stationary blades on the low pressure side of the turbine 4 to cool the stationary blades of the turbine 4.

Thus, air for cooling is cooled by the cooler 10 and the cooler 14, so that the temperature of air introduced to the stationary blades of the turbine 4 can be lowered. Hence, a sufficient cooling effect is obtained by a small amount of air, and the amount of compressed air bled through an introduction passage 7 can be decreased. Accordingly, an amount of air charged into a combustor 3 can be increased, thus making it possible to convert the compression power into turbine output effectively.

Figure 3:
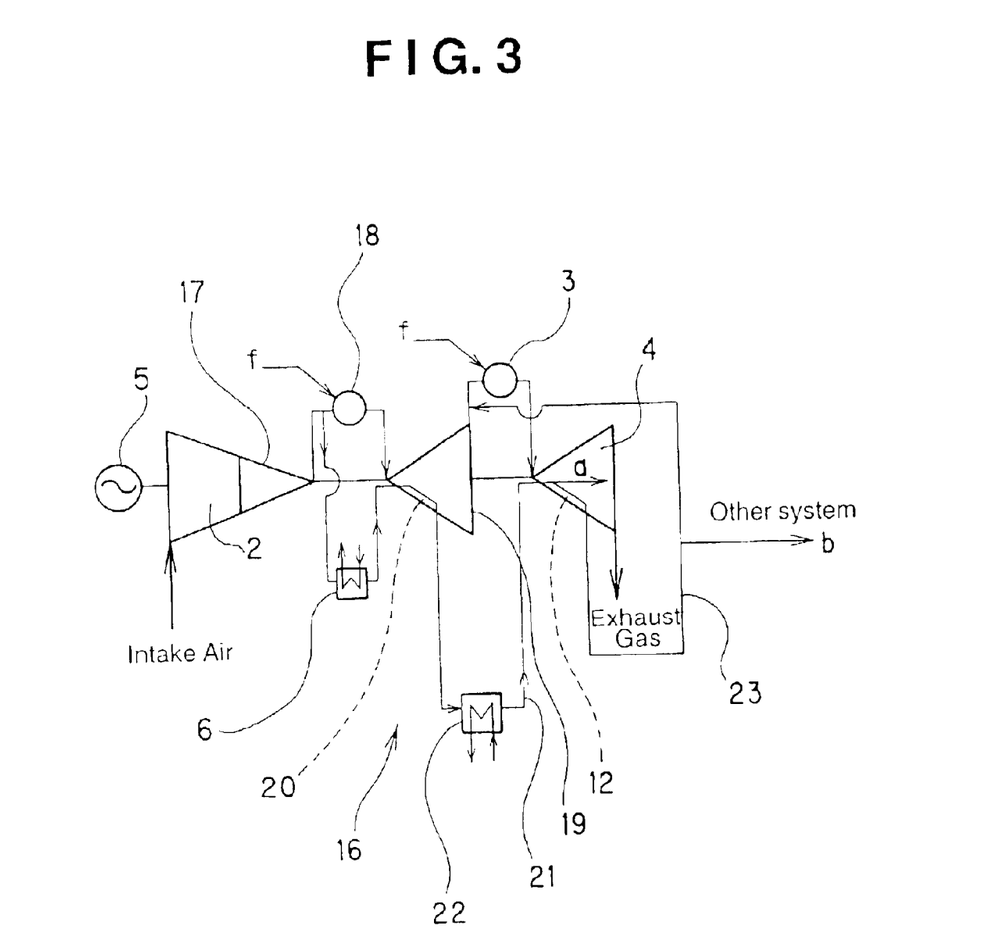
FIG. 3 is a schematic system diagram of turbine equipment according to a third embodiment of the present invention.

Turbine equipment 16 according to the third embodiment is described based on FIG. 3. The same constituent elements as in the turbine equipment 11 shown in FIG. 2 are assigned the same numerals, and duplicate explanations are omitted.

As shown in FIG. 3, the turbine equipment 16 further has a compressor 17, a combustor 18 and a turbine 19 on a high pressure side. The high pressure side turbine 19 is provided with an air recovery blade 20, and air discharged from the compressor 17 and cooled by a cooler 6 is introduced to the air recovery blade 20. An introduction passage 21 is provided for guiding air, which has been recovered from the air recovery blade 20, to an air recovery blade 12 of a turbine 4 on a low pressure side. The introduction passage 21 is equipped with a cooler 22. Air, which has passed through the air recovery blade 20, is cooled by the cooler 22, and introduced to the air recovery blade 12 of the turbine 4. An exhaust gas incorporation passage 23 is provided for incorporating air, which has passed through the air recovery blade 12, into an exhaust gas from the turbine 19 on the high pressure side.

It is permissible to guide air from the introduction passage 21 to a working fluid for the low pressure side turbine 4 (incorporation passage a), rather than to the air recovery blade 12. The air recovered from the air recovery blade 12 can be fed to and used for other instrument system b, without being incorporated into the exhaust gas from the high pressure side turbine 19.

Figure 4:
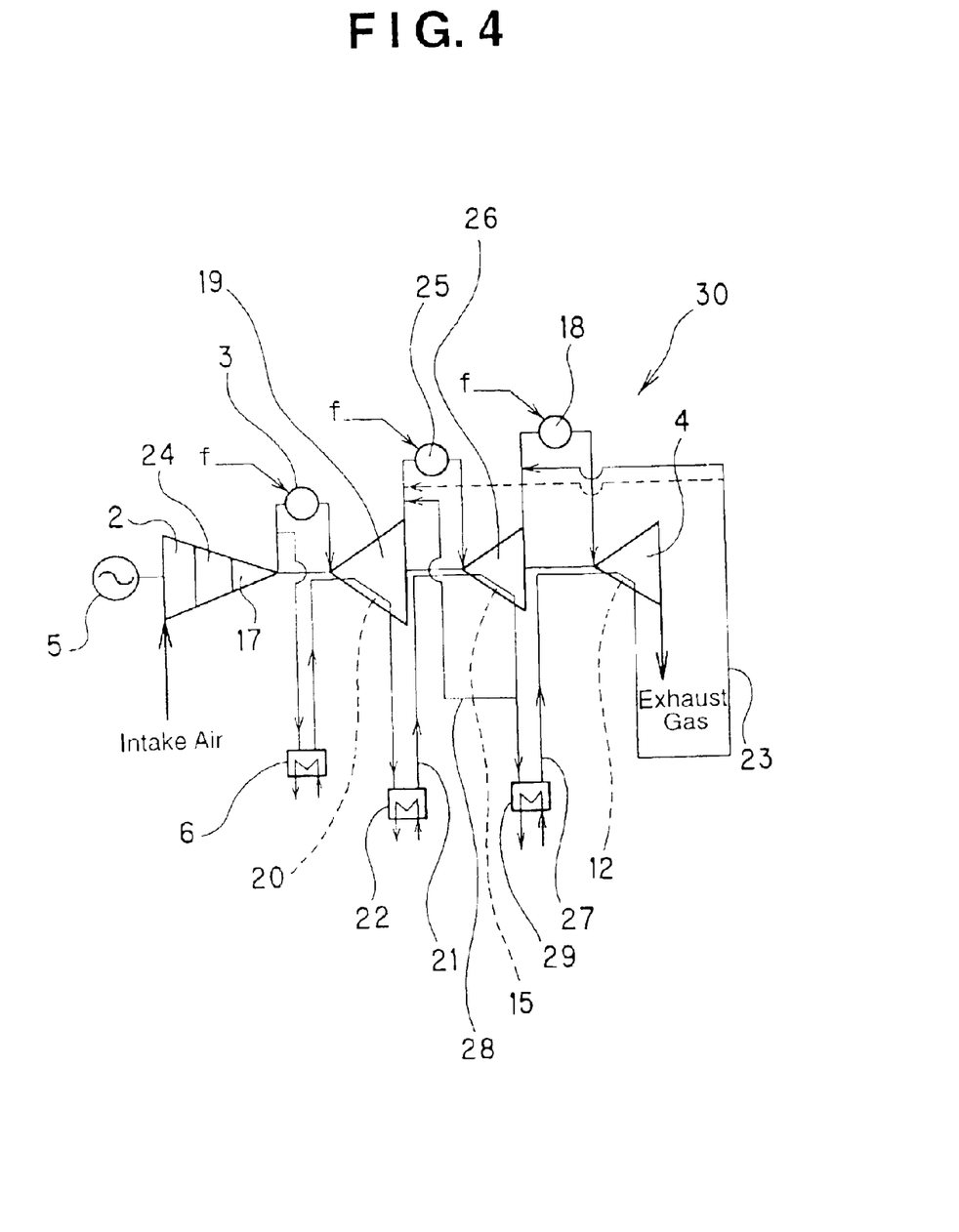
FIG. 4 is a schematic system diagram of turbine equipment according to a fourth embodiment of the present invention.

The embodiment shown is an embodiment in which low pressure side compressor 2, combustor 3 and turbine 4, and high pressure side compressor 17, combustor 18 and turbine 19 are provided in series. However, like turbine equipment 30 according to the fourth embodiment shown in FIG. 4, a compressor 24, a combustor 25 and a turbine 26 on an intermediate pressure side can be further provided in series, an air recovery blade 15 can be provided in the turbine 26, and an introduction passage 27, an exhaust gas incorporation passage 28 and a cooler 29 can be provided. In this case, an exhaust gas flowing through the exhaust gas incorporation passage 28 is incorporated into the exhaust gas side of the high pressure side turbine 19 (indicated by a solid line in the drawing). The air flowing through the exhaust gas incorporation passage 23, on the other hand, may be incorporated into the exhaust gas side of the turbine 19 (indicated by a dotted line in the drawing), or into the exhaust gas side of the intermediate pressure side turbine 26 (indicated by a solid line in the drawing).

In the above-described turbine equipment 16, air recovered from the air recovery blade 20 is cooled by the cooler 22, and introduced to the air recovery blade 12 of the turbine 4. Further, air recovered from the air recovery blade 12 is incorporated into the exhaust gas from the high pressure side turbine 19. Thus, air for cooling is cooled by the cooler 6 and the cooler 22, so that common air is introduced to the stationary blades of the turbine 4 and the turbine 19. Hence, the amounts of air charged into the combustors and the turbines increase, thus making it possible to convert the compression power into turbine output effectively.

Figure 5:
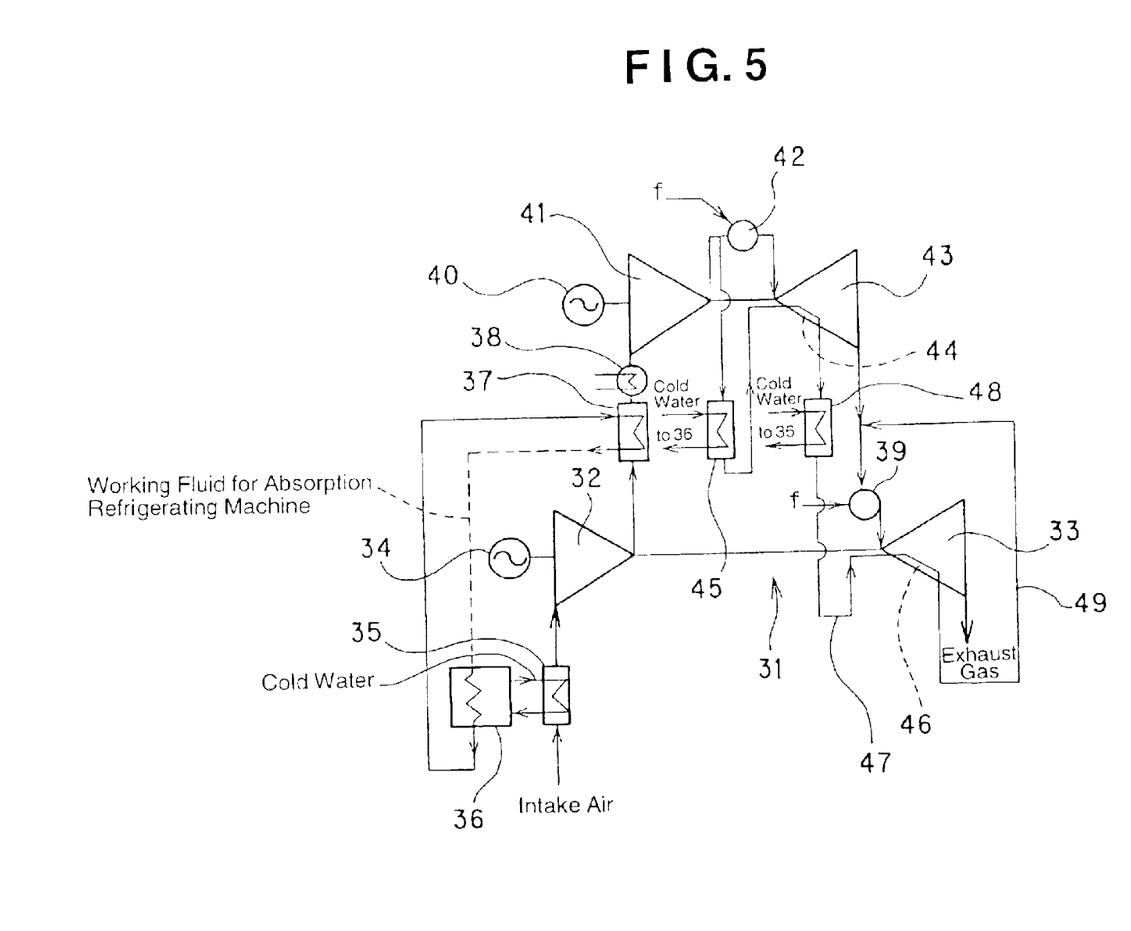
FIG. 5 is a schematic system diagram of turbine equipment according to a fifth embodiment of the present invention.

Turbine equipment 31 according to the fifth embodiment is described based on FIG. 5.

As shown in FIG. 5, the turbine equipment 31 has a compressor 32, a combustor 39 and a turbine 33, and a generator 34 is coaxially connected to the compressor 32. Moreover, a compressor 41, a combustor 42 and a turbine 43 on a high pressure side are also provided. A set of the compressor 32, combustor 39 and turbine 33, and a set of the compressor 41, combustor 42 and turbine 43 are disposed in parallel. A generator 40 is coaxially connected to the compressor 41.

Intake air cooled by a cooler 35 is introduced into the compressor 32, where it is compressed. An absorption refrigerating machine 36, which is actuated by recovered heat from a cooler 37, is provided. Compressed air, which has been compressed by and discharged from the compressor 32, is charged into the intake air cooler 37 and a cooler 38 for cooling, and is then compressed by the high pressure side compressor 41. The intake air cooler 37 feeds a working fluid (e.g., hot water, steam) for the absorption refrigerating machine 36. Compressed air compressed by and discharged from the compressor 41 is charged, together with fuel f, into the combustor 42, and a combustion gas from the combustor 42 is expanded by the turbine 43. An exhaust gas from the turbine 43 is charged, together with fuel f, into the combustor 39, and a combustion gas from the combustor 39 is expanded by the turbine 43.

The turbine 43 is provided with an air recovery blade 44, and part of compressed air discharged from the compressor 41 is cooled by a cooler 45, and introduced to the air recovery blade 44. The turbine 33 is provided with an air recovery blade 46, and an introduction passage 47 is provided for guiding air, which has been recovered from the air recovery blade 44, to the air recovery blade 46 of the turbine 33. The introduction passage 47 is equipped with a cooler 48, where air for blade cooling is cooled with cold water from the absorption refrigerating machine 36. An exhaust gas incorporation passage 49 is provided for incorporating air, which has been recovered from the air recovery blade 46, into an exhaust gas from the turbine 43.

In the above-described turbine equipment 31, the set of the compressor 32, combustor 39 and turbine 33, and the set of the compressor 41, combustor 42 and turbine 43 are disposed in parallel. The cooler 35 and the intake air cooler 37 are provided on the entrance side of the compressor 32 and the compressor 41. By this arrangement, intake air for the compressor 32, and intake air for the compressor 41 are cooled to increase the efficiency. Moreover, air for cooling the turbine 33 and the turbine 43 is cooled by the coolers 45, 48, so that the temperature of air introduced to stationary blades of the turbine 33 and the turbine 43 is lowered. Because of this drop in temperature, a sufficient cooling effect is obtained by a small amount of air. Thus, the amounts of air fed from the combustor 42 to the turbine 43, and air fed from the combustor 39 to the turbine 33, as well as the amount of exhaust gases, can be increased. Hence, it becomes possible to increase fluids which are converted into turbine output effectively. Furthermore, the absorption refrigerating machine 36 is actuated by recovered heat from the intake air cooler 37. Thus, in addition to heat recovery, the intake air cooler 35 and the coolers 45, 48 perform air cooling with cold water from the absorption refrigerating machine 36.

Figure 6:
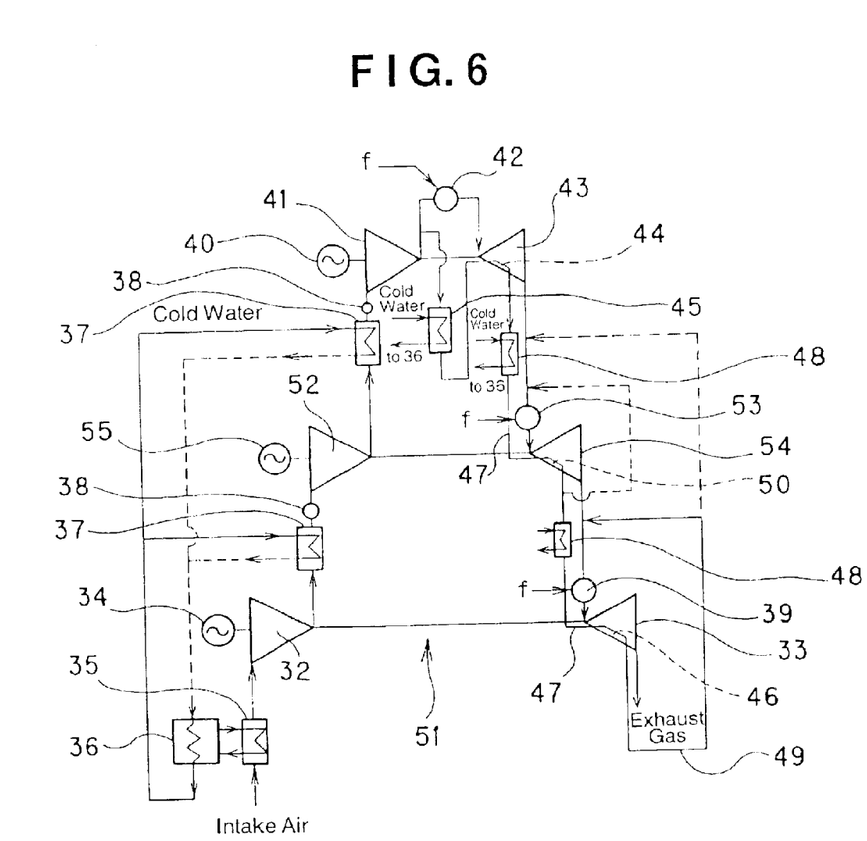
FIG. 6 is a schematic system diagram of turbine equipment according to a sixth embodiment of the present invention.

The foregoing turbine equipment 31 is biaxial equipment having the set of the compressor 32, combustor 39 and turbine 33, and the set of the compressor 41, combustor 42 and turbine 43 disposed in parallel. However, the turbine equipment may be triaxial equipment, like turbine equipment 51 according to the sixth embodiment shown in FIG. 6, which further has a set of a compressor 52, a combustor 53, a turbine 54 having an air recovery blade 50, and a generator 55 on an intermediate pressure side disposed in parallel with the above two sets. In this case, exhaust gas from the exhaust gas incorporation passage 49 is incorporated into both of (or one of) the exhaust gas side of the intermediate pressure side turbine 43 (indicated by a solid line in the drawing) and an exhaust gas side of the high pressure side turbine 43 (indicated by a dotted line in the drawing).

Figure 7:
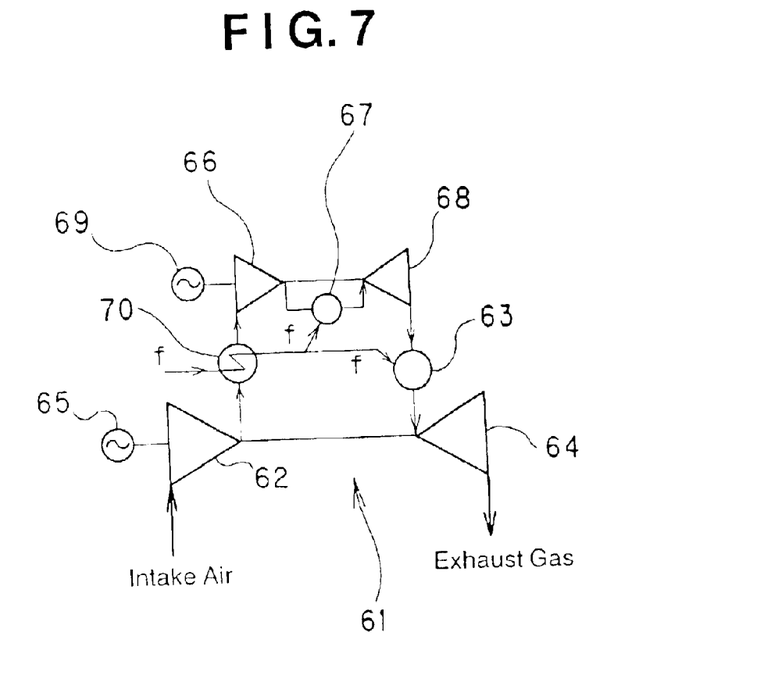
FIG. 7 is a schematic system diagram of turbine equipment according to a seventh embodiment of the current invention.

Turbine equipment 61 according to the seventh embodiment is described based on FIG. 7.

As shown in FIG. 7, the turbine equipment 61 has a compressor 62, a combustor 63 and a turbine 64, and a generator 65 is coaxially connected to the compressor 62. Moreover, a compressor 66, a combustor 67 and a turbine 68 on a high pressure side are also provided. A set of the compressor 62, combustor 63 and turbine 64, and a set of the compressor 66, combustor 67 and turbine 68 are disposed in parallel. A generator 69 is coaxially connected to the compressor 66.

Since air after having been compressed by the compressor 62 has a high temperature, it is charged into the compressor 66, after its temperature is lowered by heat exchange with fuel f in a fuel heater 70. This manner corresponds to the use of fuel f as a cold heat source for a cooler (FIG. 5, numeral 37). Compressed air, which has been compressed by and discharged from the compressor 66, is charged into the combustor 67, together with fuel f heated by the fuel heater 70. A combustion gas from the combustor 67 is expanded by the turbine 68. An exhaust gas from the turbine 68 is charged into the combustor 63, together with fuel f heated by the fuel heater 70, and a combustion gas from the combustor 63 is expanded by the turbine 64.

The above-described turbine equipment 61 is designed such that the intake air to be charged into the compressor 66 undergoes heat exchange with the fuel f in the fuel heater 70. Thus, cooling of intake air can be carried out by a very simple configuration, and compression power can be decreased. Furthermore, recovered heat is converted into the potential heat of fuel, so that a fuel saving results in a high electrical efficiency.

Figure 8:
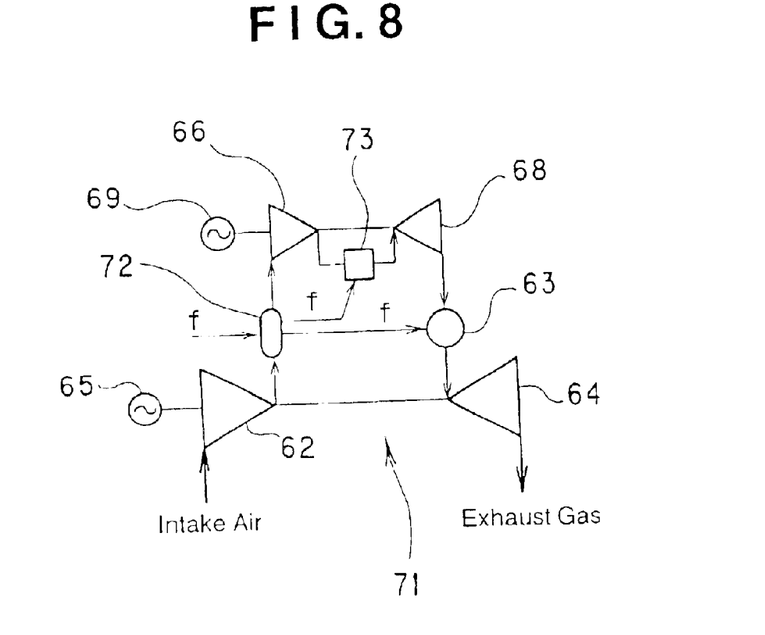
FIG. 8 is a schematic system diagram of turbine equipment according to an eighth embodiment of the present invention.

Turbine equipment 71 according to the eighth embodiment is described based on FIG. 8. The same constituent elements as in the turbine equipment 71 shown in FIG. 7 are assigned the same numerals, and duplicate explanations are omitted.

The illustrated turbine equipment 71 is provided with a reformer 72 having a reforming catalyst, instead of the fuel heater 70, and has a fuel cell 73 instead of the combustor 67. High temperature compressed air, which has been compressed by a compressor 62, is charged into the reformer 72, where it is used as a heat source for fuel reforming (methane, methanol, and the like) to perform heat exchange (cooling). The fuel reformed by the reformer 72 is fed to the fuel cell 73, and also charged into a combustor 63. An exhaust gas from a turbine 68 is charged into the combustor 63, together with the fuel reformed by the reformer 72. A combustion gas from the combustor 63 is expanded by a turbine 64.

In the above-described turbine equipment 71, compressed air to be charged into the compressor 66 is cooled by the reformer 72, and the fuel reformed by the reformer 72 is charged into the combustor 63. Thus, cooling of intake air can be performed without the use of an instrument dedicated to cooling, and fuel consumption can be reduced by increasing the calories of fuel.

Figure 9:
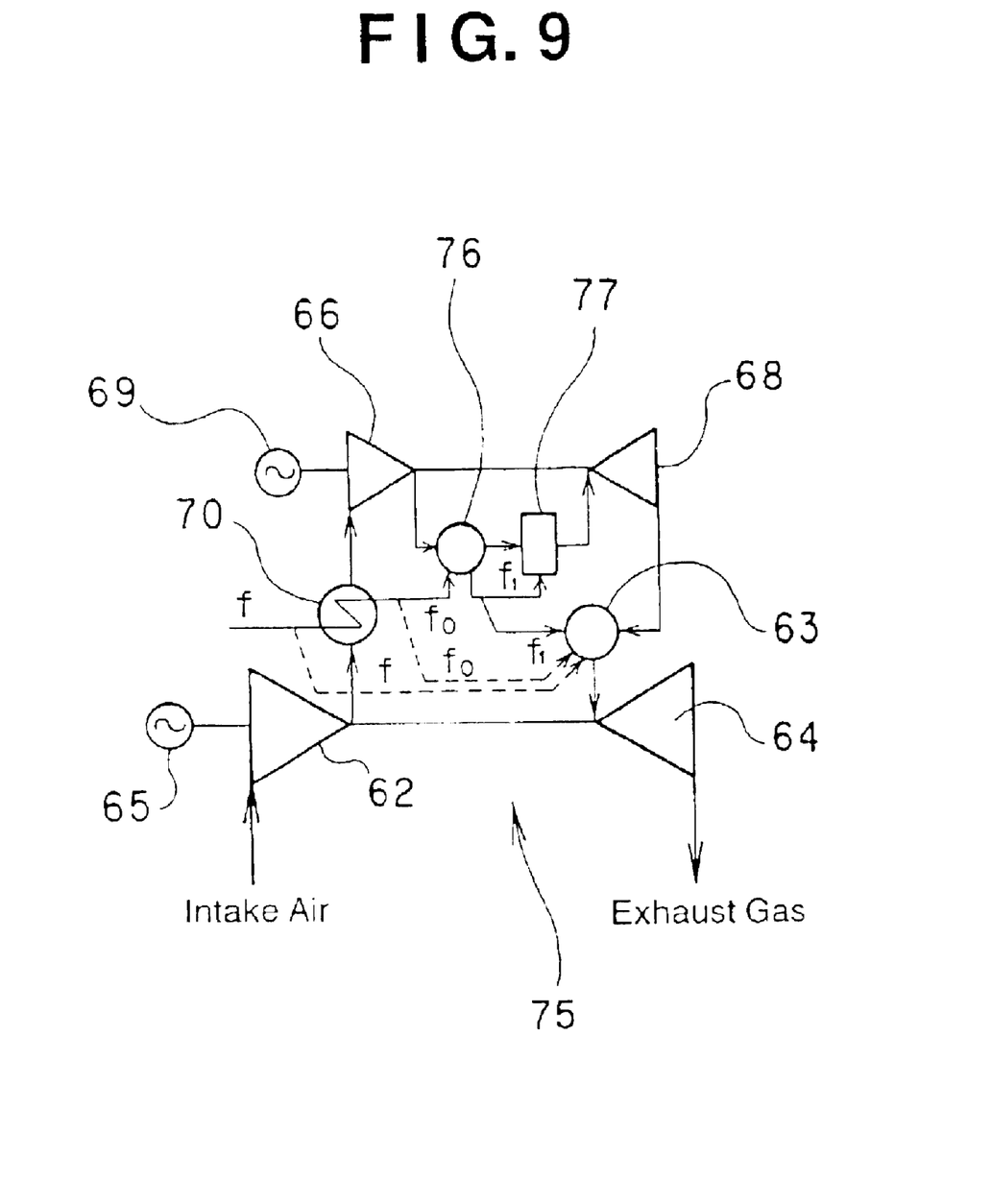
FIG. 9 is a schematic system diagram of turbine equipment according to a ninth embodiment of the present invention.

Turbine equipment 75 according to the ninth embodiment is described based on FIG. 9. The same constituent elements as in the turbine equipment 71 shown in FIG. 7 are assigned the same numerals, and duplicate explanations are omitted.

The illustrated turbine equipment 75 is provided with a reformer 76 having a reforming catalyst and a fuel cell 77, instead of the combustor 67, and reformed fuel $f_1$ from the reformer 76 is charged into the combustor 63. Fuel $f_0$ heated by a fuel heater 70 is charged into the reformer 76, where it is used as a heat source for fuel reforming, together with high temperature discharged air from a compressor 66. The fuel $f_1$ reformed by the reformer 76 is fed to the fuel cell 77, and also charged into the combustor 63. Any of the fuel $f_0$ from the fuel heater 70 and the original fuel f can be used for the combustor 63. An exhaust gas from a turbine 68 is charged into the combustor 63, together with the fuels f, $f_0$ and $f_1$. A combustion gas from the combustor 63 is expanded by a turbine 64.

In the above-described turbine equipment, intake air to be charged into the compressor 66 undergoes heat exchange with the fuel f in the fuel heater 70. Thus, cooling of intake air can be carried out by a very simple configuration, and compression power to the compressor 66 can be decreased. Moreover, the fuel f heated by the fuel heater 70 is reformed by the reformer 76, and fed to the fuel cell 77, so that the fuel cell 77 can be operated at a high pressure. Furthermore, the fuels $f_1$, $f_0$ reformed by the reformer 76 are charged into the low pressure side combustor 63 in order to achieve a reduction in fuel consumption by the calorie increase of fuel.

INDUSTRIAL APPLICABILITY

As described above, air for blade cooling can be cooled by the cooler, and introduced into the turbine. Thus, the temperature of air introduced to the blades of the turbine can be lowered. Moreover, compressed air for blade cooling can be reduced to increase air for turbine actuation. Thus, it becomes possible to convert compression power into turbine output effectively. Accordingly, turbine equipment with increased power generation output is realized.

What is claimed is:

1. A system comprising:

a first compressor;

a first turbine having an air recovery blade therein;

a first passage for guiding a portion of air discharged from an exit of said first compressor to said air recovery blade, and for guiding air which has been recovered from said air recovery blade to blades on a side of said first turbine that is at a lower pressure than is a side of said first turbine on which said air recovery blade is positioned;

a first cooler for cooling air that has been recovered from said air recovery blade, said first cooler being provided in said first passage; and a second passage for merging air, bled from said first compressor upstream of said exit of said first compressor, with air flowing from said first cooler.

* * * * *